FOOD FRESHENER-WARMING DEVICE

Original Filed Oct. 27, 1970 3 Sheets-Sheet 1

INVENTORS
DAVIS PIPER &
HARRY D. FORSE

BY
MELVILLE STRASSER FOSTER
& HOFFMAN ATTORNEY

FOOD FRESHENER-WARMING DEVICE

Original Filed Oct. 27, 1970 3 Sheets-Sheet 2

INVENTORS
DAVIS PIPER &
HARRY D. FORSE
BY
MELVILLE STRASSER FOSTER
& HOFFMAN
ATTORNEY

FOOD FRESHENER-WARMING DEVICE

Original Filed Oct. 27, 1970 3 Sheets-Sheet 3

INVENTORS
DAVIS PIPER &
HARRY D. FORSE

BY
MELVILLE STRASSER FOSTER
& HOFFMAN
ATTORNEY

United States Patent Office

Re. 28,292
Reissued Jan. 7, 1975

28,292

FOOD FRESHENER-WARMING DEVICE

Davis Piper, Tipton, and Harry D. Forse, Anderson, Ind., assignors to Food-Quik Products, Inc., Anderson, Ind.

Original No. 3,630,761, dated Dec. 28, 1971, Ser. No. 84,373, Oct. 27, 1970, which is a continuation of abandoned application Ser. No. 49,764, June 25, 1970. Application for reissue July 3, 1972, Ser. No. 268,461
Int. Cl. B01j *3/00*
U.S. Cl. 99—483 11 Claims

Matter enclosed in heavy brackets [ ] appears in the original patent but forms no part of this reissue specification; matter printed in italics indicates the additions made by reissue.

ABSTRACT OF THE DISCLOSURE

Apparatus wherein steam is continuously circulated through a steam reservoir chamber in the device, which keeps it and an attached second chamber and head portion hot. Steam passing via an operator controlled valve from the reservoir chamber to the second chamber is dried, and the dry steam escapes through spaced orifices in a head portion to warm and freshen food items placed thereon.

CROSS-REFERENCE TO EARLIER APPLICATION

This application is a continuation of U.S. application for patent Ser. No. 49,764, filed June 25, 1970, now abandoned and entitled Food Freshener-Warming Device by Davis Piper and Harry D. Forse.

BACKGROUND OF THE INVENTION

This invention relates to the quick food service business wherein precooked food items, such as sandwiches and the like, must be quickly heated for service to a customer. According to this invention, the heating and/or freshening of food items is accomplished by means of heat and dry steam.

Prior art efforts to utilize steam for the quick heating and/or freshening of food items have been unsuccessful for many reasons. First of all, all such prior art devices include a head portion upon which the food item is placed for heating. According to these prior art devices, the head portion is permitted to cool while not in use. Therefore, a period of warmup is required to bring the head portion to the necessary temperature for satisfactory heating and/or freshening.

In addition, all of the prior art devices contemplate a valve which, at the control of an operator, is effective to apply steam through the head portion to a food item placed thereon. By virtue of the location of the valve means and the coolness of the head portion itself, the devices of the prior art were prone to produce, at least initially, a wet steam. This wet steam, rather than freshening a product, particularly in the case of a sandwich, would render it soggy and totally unsatisfactory for sale.

Therefore, it is the object of this invention to provide an instant source of dry steam which when desired can be used to impinge upon and/or be circulated into the food item to be warmed and freshened.

This novel device has a particularly large application in the quick service food business for warming and freshening already made sandwiches, buns, etc., where such items must be instantly warmed and freshened while the customer waits, without becoming soggy and without having the customer experience delay such as is involved with prior devices wherein it is necessary to exhaust a quantity of steam and moisture before attempting to use the steam to warm and freshen the food item.

It is further the object of this invention to provide a head portion which will remain hot at all times while the device is in service whether or not food is being freshened by the directed dry steam.

It is still a further object of this invention to overcome the prior art problem of steam condensing as it was conducted from the steam reservoir into the chamber from which it is permitted to escape and warm and freshen food items.

Still another object of this invention is to provide a means of reheating the steam prior to use to warm and/or freshen food and for revaporizing any entrained moisture that might possibly be in the steam as it comes from the device's steam reservoir in order to assure that the steam used to warm and freshen the food is absolutely dry under the prevailing use conditions.

Another objective of this invention is to provide a means whereby steam will circulate naturally through a steam reservoir chamber of a food freshening-warming device to keep it and all attached components hot at all times while it is in service and at the same time provide a means for any condensate which may form therein to return to the boiler.

SUMMARY OF THE INVENTION

The device according to this invention includes a vessel haviny an internal partition effective to divide the vessel into two separate chambers. Steam from a suitable boiler is continuously circulated through the first chamber, so that the entire vessel is maintained at substantially the temperature of the steam passing therethrough.

An internally mounted, operator controlled valve is effective to control the flow of steam from the first chamber into the second chamber. Steam from the second chamber is then applied through various apertures to a food item to be warmed or freshened.

DESCRIPTION OF THE PREFERRED EMBODIMENT

Figure 1:
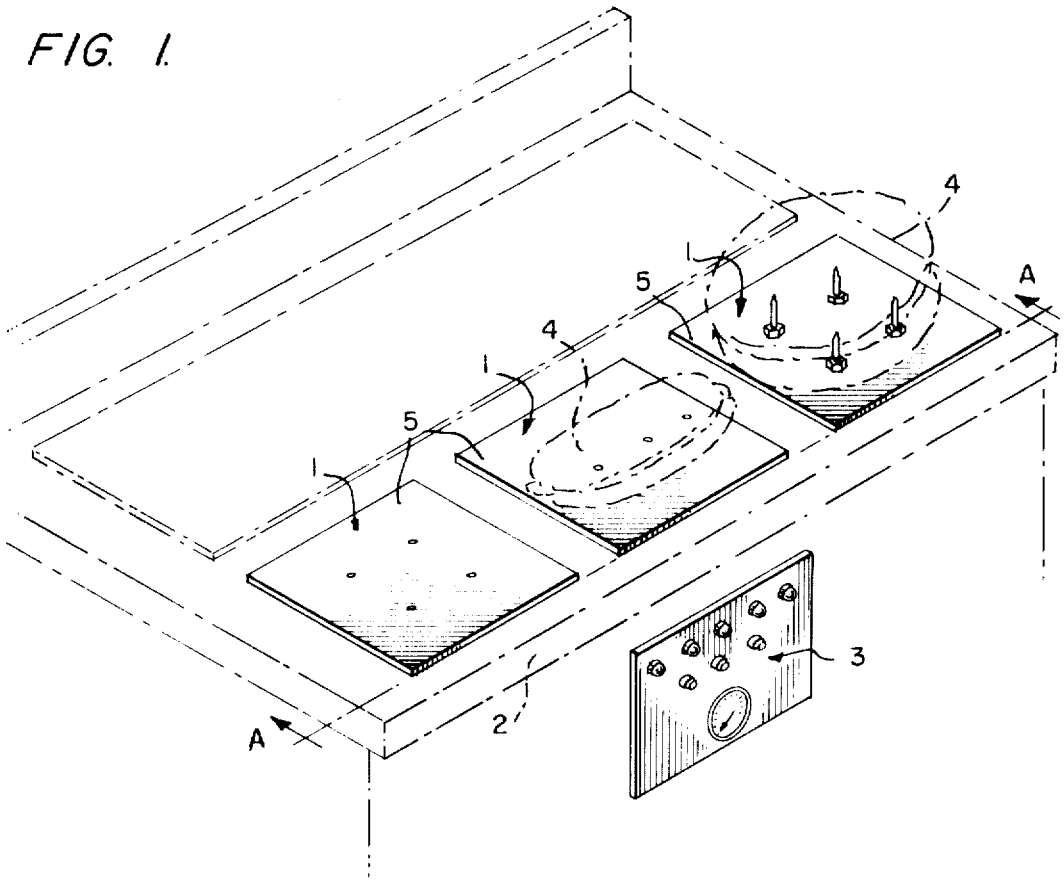
FIG. 1 is a perspective view showing the head portion and steam escape orifices for three devices according to this invention.
Figure 2:
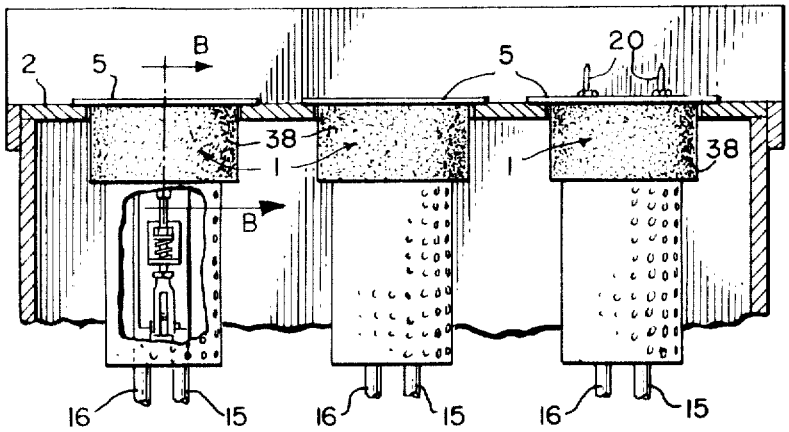
FIG. 2 is a cross-sectional view along the line A—A of FIG 1.

The invention contemplates a device generally indicated at 1 for warming and freshening food items, and is shown in FIG. 1 installed in a counter-top or service cabinet 2 with controls 3 for use by the operator to actuate the device to utilize dry steam to warm and/or to freshen a food article as, for example, sandwiches 4 shown generally in FIG. 1 placed upon the head portion 5.

Figure 3:
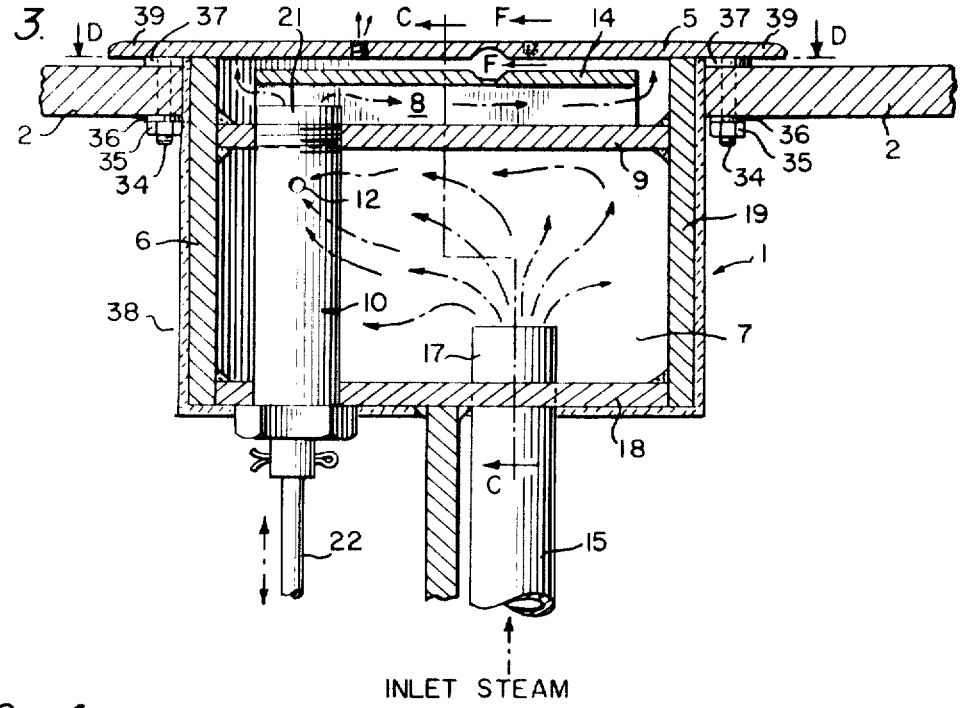
FIG. 3 is a cross-sectional view along the line B—B of FIG. 2.
Figure 4:
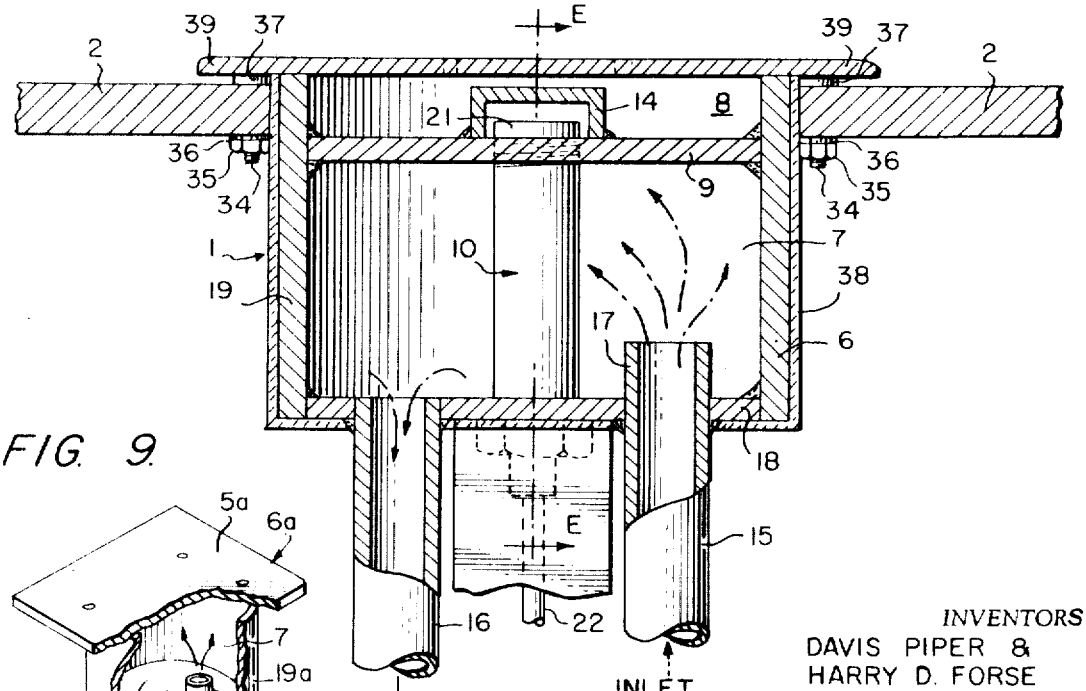
FIG. 4 is a cross-sectional view along the line C—C of FIG. 3.
Figure 9:
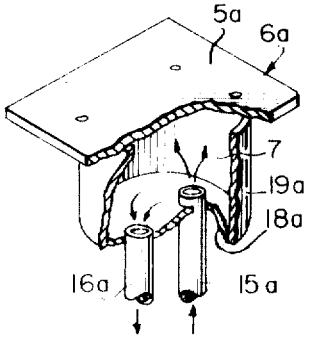
FIG. 9 is a perspective view showing a hotplate according to one aspect of this invention.
Figure 5:
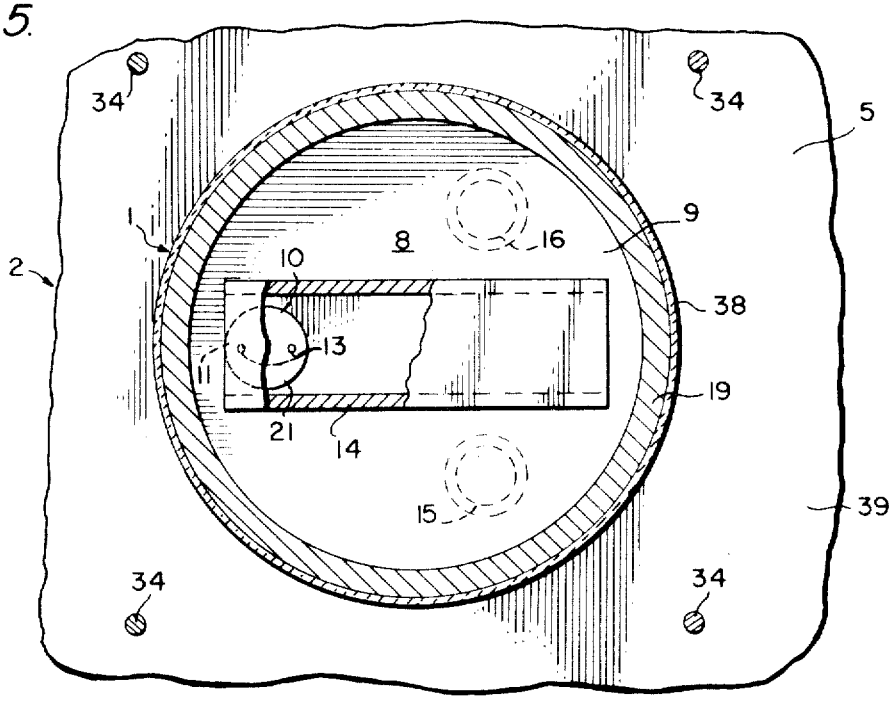
FIG. 5 is a cross-sectional view along the line D—D of FIG. 3.

The device as shown in FIGS. 3, 4, and 5 consists of a closed vessel 6 having a steam reservoir or first steam chamber 7 and an upper or second steam chamber 8 with a solid partition 9 therebetween, separating these chambers. The valve indicated generally at 10 is located within the steam reservoir 7. It includes a body portion 11 that extends through the partition 9 to conduct steam from the reservoir 7 to the second chamber 8 as explained hereinafter. The lower section of the body portion 11 is provided with a bore 11a which slidably receives the valve plunger 23 and ball 24. The O-ring or packing 26 simply prevents steam from bypassing the valve plunger.

Figure 6:
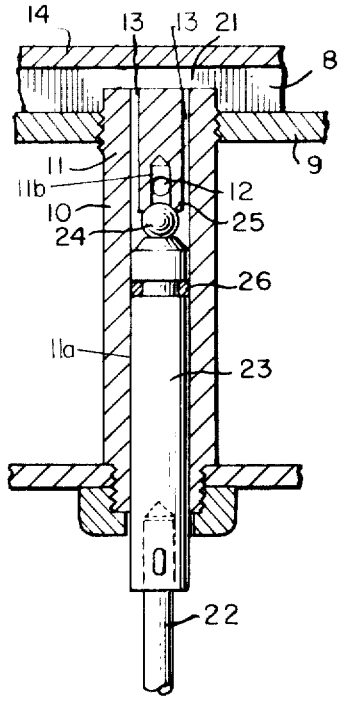
FIG. 6 is a cross-sectional view along the line E—E of FIG. 4.

The upper end of the valve body 11 is provided with one or more small passages 13. As shown in the drawings, two passages 13 are drilled from the upper end of the body portion 11 into the bore 11a. The central portion of the valve body 11 is provided with the counterbore 11b (clearly shown in FIG. 6) which communicates with steam reservoir 7 via the aperture 12 (FIGS. 3 and 6) which is drilled through the valve body 11 transverse to its axis. Thus, communication between the steam reservoir 7 and second chamber 8 is provided via the aperture 12, counterbore 11b, past a ball 24, and through the passages 13. It will be apparent that the lowermost end of the counterbore 11b (as shown in FIG. 6) serves as a valve seat 25 which is opened and closed by the ball 24.

The steam reservoir 7 is provided with a steam inlet 15 and a steam outlet or return line 16 which are disposed in the bottom 18 of the vessel 6 in any conventional manner. It will be observed that the inlet 15 has an extended end portion 17 extending above the bottom 18 a short distance to prevent steam entering the reservoir 7 through the inlet from passing through or picking up any condensate which may accumulate on the inside surface of the bottom 18. By the same token, the steam outlet or return 16 has its upper end at or below the inside surface of the bottom 18, so that any condensate which collects upon the bottom of chamber 7 will drain out.

The inlet and outlet 15 and 16, respectively, will be connected to a conventional boiler supplying steam under pressure. By virtue of this design, steam will automatically and naturally circulate in and through the reservoir 7, whether or not the upper chamber 8 and head portion 5 are in use. This circulating steam under pressure will deliver sufficient heat energy to overcome radiant heat losses and keep the temperature of all components in excess of 212° F. Thus, once the unit has been brought up to temperature, it will remain at this temperature at all times, ready for operation.

In order to utilize dry steam for food warming and/or freshening, the valve plunger 23 is moved downwardly by any suitable actuating means. That is, the actuating shaft 22 may be connected to an electrical solenoid, an hydraulic or pneumatic operating mechanism, or a fully mechanical linkage structure.

In any event, downward movement of the plunger 23 and ball 24 will permit steam from the reservoir 7 to pass through the aperture 12, the counterbore 11b, past the valve seat 25, and through the passages 13 into the upper steam chamber 8.

Disposed within the second chamber 8 is the heat exchanger-moisture vaporizer means 14. This is in the form of an inverted, open-ended channel which is secured to the partition 9, and disposed over the passages 13, so that steam injected into the second chamber 8 through the passages 13 impinges upon the heat exchanger-moisture vaporizer 14. It will be recognized that means 14, by virtue of its attachment to the partition 9, will be maintained at an elevated temperature. Thus, any entrained moisture which is released from the steam passing the reservoir 7 is reheated, revaporized and dried prior to its entering the second chamber 8.

The now fully dry steam enters the open area of the second chamber 8 by passing out the open ends of the heat exchanger-moisture vaporizer 14, and is ready to be utilized for warming and/or freshening food items placed upon the head portion 5.

According to the preferred embodiment of the invention, the steam inlet 15, outlet 16, and valve 10 are all spaced apart from each other as clearly shown in FIG. 5. This provides for a relatively long path of travel for the recirculating steam in the reservoir 7 in order to insure even heating of the vessel 6 and prevent insofar as possible the presence of condensate.

Figure 7:
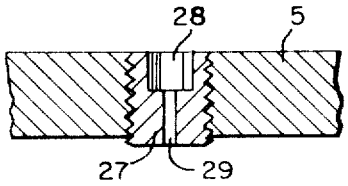
FIG. 7 is a cross-sectional view on a greatly enlarged scale showing one type of steam escape orifice.
Figure 8:
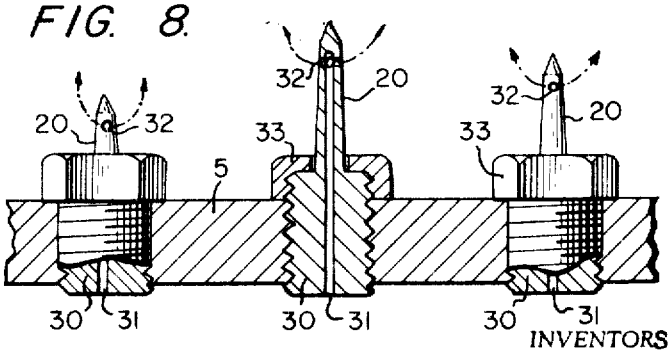
FIG. 8 is a view, partly in section, showing various additional types of steam escape orifices.

Steam from the upper chamber 8 may be applied to a food article placed on the head in a variety of conventional ways. For example, as shown in FIGS. 7 and 8, the head 5 is provided with a plurality of threaded openings which receive various inserts. According to FIG. 7, there is a removable insert 27 provided with an Allen head fitting 28 in its upper end. When installed, the top end of the fitting 28 is flush with the top surface of the head 5. This insert has an appropriately sized orifice 29 by means of which steam can pass from the second chamber 8 onto a food item placed on the head portion 5.

FIG. 8 illustrates three different sized steam escapement needles 30 which may be threaded into apertures in the head 5. Each of the inserts 30 includes a needle portion 20 provided with a cross bore 32 and a central passage 31. The lock nut 33 serves to securely hold the inserts 30 in place.

FIGS. 3, 4 and 5 show in general one method for attaching the device of this invention to a cabinet top 2. The head 5 is provided with an outwardly extending flange 39 which carries on its under surface a plurality of threaded studs 34. The studs fit through mating holes in the counter top and may be secured thereto with the conventional fastener 35. Preferably, heat insulating washers 36 will be used on the underside of the counter top 2, and a heat insulating sleeve or washer 37 on the top side of the counter 2, so as to keep the heat loss of head 5 as low as possible, and to prevent undue heating of the counter top itself.

The entire vessel 6 is preferably surrounded by suitable, conventional insulation 38, such as asbestos or fiber glass. This serves both to maintain heat within the vessel, and as a safety precaution.

It is believed that operation of the device will be apparent from the foregoing description. An operator may place a food item, such as a sandwich, on the head portion. By actuating the valve 10, dry steam passes from the reservoir chamber 7 into the second chamber 8, and then is applied directly to the food item. This is substantially an instantaneous operation. Sandwiches, meat slices and the like, either unwrapped or wrapped, may be warmed and freshened very quickly.

No limitations on this invention are to be inferred or implied from the foregoing description of a preferred embodiment.

The embodiments of the invention in which an exclusive property or privilege is claimed are defined as follows:

1. A food freshener and/or warming device comprising:

a. a closed vessel;

b. partition means within said vessel dividing the interior thereof into first and second chambers;

c. means for continuously [recirculating] *circulating* steam through said first chamber *comprising a steam inlet having an opening in said first chamber spaced above the bottom thereof and a steam outlet having an opening disposed in the bottom of said first chamber whereby steam from a source thereof may be continuously caused to enter said first chamber through said steam inlet thereof, pass through said first chamber and exit said first chamber via said steam outlet thereof;* d. passage means having an inlet in said first chamber and an outlet in said second chamber;

e. operator controlled valve means for controlling the flow of steam through said passage means from said first chamber to said second chamber; and f. aperture means for applying steam from said second chamber to a food item.

2. The device claimed in claim 1 wherein said valve means is disposed within said vessel.

3. The device claimed in claim 1 including heated means disposed in said second chamber and positioned with respect to said outlet whereby steam passing through said outlet is discharged against said heated means.

[4. The device claimed in claim 3 wherein said heated means comprises an inverted, open ended channel secured to said partition means.]

5. The device claimed in claim 2 including heated means disposed in said second chamber and positioned with respect to said outlet whereby steam passing through said outlet is discharged against said heated means.

6. The device claimed in claim 1 including external means for actuating said valve means.

[7. The device claimed in claim 1 wherein said means for continuously recirculating steam through said first chamber includes a steam outlet having an opening in said first chamber spaced above the bottom thereof, and a steam outlet having an opening disposed in the bottom of said first chamber.]

8. In an apparatus for freshening and/or warming food items including a vessel having first and second steam chambers, means for supplying steam to said first chamber, and means for applying steam from said second chamber to a food item; the improvement comprising: passage means having an inlet in said first chamber and an outlet in said second chamber, and operator controlled means mounted within said vessel for controlling the flow of steam from said first chamber to said second chamber.

9. The improvement claimed in claim 8 including heated means disposed in said second chamber and positioned with respect to said outlet whereby steam passing through said outlet is discharged against said heated means.

10. In an apparatus for freshening and/or warming food items including a vessel having first and second chambers therein; means for supplying steam to said first chamber, passage means having an inlet in said first chamber and an outlet in said second chamber for the passage of steam from said first chamber to send second chamber, and means for applying steam from said second chamber to a food item; the improvement comprising means disposed in said second chamber and positioned with respect to said outlet whereby steam passing through said outlet is discharged against said means.

11. The improvement claimed in claim 10 wherein said last mentioned means is heated by contact with a portion of said first chamber.

*12. A food freshener and/or warming device comprising:*

*(a) a closed vessel;*

*(b) partition means within said vessel dividing the interior thereof into first and second chambers;*

*(c) means for continuously recirculating steam through said first chamber comprising a steam inlet having an opening in said first chamber spaced above the bottom thereof and a steam outlet having an opening disposed in the bottom of said first chamber whereby steam from a source thereof may be continuously caused to enter said first chamber through said steam inlet thereof, pass through said first chamber and exit said first chamber via said outlet thereof back to said source;*

*(d) passage means having an inlet in said first chamber and an outlet in said second chamber;*

*(e) operator controlled valve means for controlling the flow of steam through said passage means from said first chamber to said second chamber; and*

*(f) aperture means for applying steam from said second chamber to a food item.*

*13. A food freshener and/or warming device comprising a closed vessel, partition means within the vessel dividing the interior thereof into first and second chambers, means for continuously recirculating steam through said first chamber, passage means having an inlet in said first chamber and an outlet in said second chamber, operator controlled valve means for controlling the flow of steam through said passage means for said first chamber to said second chamber, aperture means for applying steam from said second chamber to a food item and heated means disposed in said second chamber and positioned with respect to said outlet whereby steam passing through said outlet is discharged against said heated means, said heated means comprising an inverted, open ended channel secured to said partition means.*

References Cited

The following references, cited by the Examiner, are of record in the patented file of this patent or the original patent.

UNITED STATES PATENTS

| | | | |
|---|---|---|---|
| 2,617,349 | 11/1952 | Tucker | 99—483 |
| 3,307,473 | 3/1967 | Clifford et al. | 99—483 |
| 3,358,581 | 12/1967 | Harris | 126—33 X |
| 3,616,746 | 11/1971 | Sliwoski | 99—483 |
| 2,636,969 | 4/1953 | Lewis | 99—234 A UX |
| 2,786,932 | 3/1957 | Lewis | 99—234 A UX |
| 3,291,030 | 12/1966 | Arnold | 99—234 R |

EDWARD L. ROBERTS, Primary Examiner

A. O. HENDERSON, Assistant Examiner

U.S. Cl. X.R.

126—369.2